United States Patent
Li et al.

(10) Patent No.: US 10,157,619 B2
(45) Date of Patent: Dec. 18, 2018

(54) METHOD AND DEVICE FOR SEARCHING ACCORDING TO SPEECH BASED ON ARTIFICIAL INTELLIGENCE

(71) Applicant: BAIDU ONLINE NETWORK TECHNOLOGY (BEIJING) CO., LTD., Beijing (CN)

(72) Inventors: Chao Li, Beijing (CN); Xiangang Li, Beijing (CN); Jue Sun, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/823,663

(22) Filed: Nov. 28, 2017

(65) Prior Publication Data
US 2018/0151183 A1    May 31, 2018

(30) Foreign Application Priority Data
Nov. 29, 2016    (CN) .......................... 2016 1 1079405

(51) Int. Cl.
| | |
|---|---|
| G06F 17/30 | (2006.01) |
| G10L 17/26 | (2013.01) |
| G10L 25/78 | (2013.01) |
| G10L 15/02 | (2006.01) |
| G10L 15/26 | (2006.01) |
| G10L 25/27 | (2013.01) |
| G10L 25/93 | (2013.01) |
| G10L 25/30 | (2013.01) |
| G10L 15/22 | (2006.01) |

(52) U.S. Cl.
CPC ........ *G10L 17/26* (2013.01); *G06F 17/30026* (2013.01); *G06F 17/30032* (2013.01); *G10L 15/02* (2013.01); *G10L 15/26* (2013.01); *G10L 25/27* (2013.01); *G10L 25/93* (2013.01); *G10L 25/30* (2013.01); *G10L 2015/223* (2013.01); *G10L 2025/786* (2013.01)

(58) Field of Classification Search
CPC ......... G06F 17/30023; G06F 17/30026; G06F 17/30029; G06F 17/30032; G06F 17/3005; G10L 17/26; G10L 17/005; G10L 2025/783; G10L 2025/786
See application file for complete search history.

(56) References Cited

U.S. PATENT DOCUMENTS

| | | | | |
|---|---|---|---|---|
| 4,672,669 A | * | 6/1987 | DesBlache | G10L 25/78 704/237 |
| 6,286,001 B1 | * | 9/2001 | Walker | G06F 17/30867 707/697 |
| 6,336,117 B1 | * | 1/2002 | Massarani | G06F 17/30867 707/711 |
| 6,529,875 B1 | * | 3/2003 | Nakajima | A63F 13/02 704/275 |

(Continued)

*Primary Examiner* — Eric Yen
(74) *Attorney, Agent, or Firm* — Hodgson Russ LLP

(57) ABSTRACT

A method and a device for searching according to a speech based on artificial intelligence are provided. The method includes: identifying an input speech of a user to determine whether the input speech is a child speech; filtrating a searched result obtained according to the input speech to obtain a filtrated searched result, if the input speech is the child speech; and feeding the filtrated searched result back to the user.

15 Claims, 4 Drawing Sheets

(56) References Cited

U.S. PATENT DOCUMENTS

| | | | | |
|---|---|---|---|---|
| 8,160,877 B1* | 4/2012 | Nucci | G10L 17/06 | |
| | | | 704/246 | |
| 8,417,530 B1* | 4/2013 | Hayes | G06F 17/30026 | |
| | | | 704/1 | |
| 2003/0001016 A1* | 1/2003 | Fraier | G06F 17/30879 | |
| | | | 235/462.03 | |
| 2003/0105680 A1* | 6/2003 | Song | G06F 17/30572 | |
| | | | 705/26.1 | |
| 2003/0140056 A1* | 7/2003 | Wall | G06F 17/3087 | |
| 2004/0128282 A1* | 7/2004 | Kleinberger | G06F 17/30867 | |
| 2004/0139106 A1* | 7/2004 | Bachman | G06F 17/30864 | |
| 2007/0005570 A1* | 1/2007 | Hurst-Hiller | G06F 17/30654 | |
| 2008/0183694 A1* | 7/2008 | Cane | G06F 17/30867 | |
| 2009/0070293 A1* | 3/2009 | Vechersky | G06F 17/30241 | |
| 2011/0302633 A1* | 12/2011 | Windschauer | G06F 17/30867 | |
| | | | 726/4 | |
| 2012/0072424 A1* | 3/2012 | Weising | G06F 19/707 | |
| | | | 707/740 | |
| 2014/0316769 A1* | 10/2014 | Myslinski | G06Q 10/10 | |
| | | | 704/9 | |
| 2015/0032758 A1* | 1/2015 | Schneider | G06F 17/30336 | |
| | | | 707/741 | |
| 2015/0199969 A1* | 7/2015 | Choi | H04M 1/72569 | |
| | | | 704/275 | |
| 2015/0287410 A1* | 10/2015 | Mengibar | G10L 17/005 | |
| | | | 704/246 | |
| 2016/0171109 A1* | 6/2016 | Gnanasekaran | G06F 17/30867 | |
| | | | 707/733 | |
| 2017/0061014 A1* | 3/2017 | Heiler | G06F 17/30867 | |
| 2017/0337610 A1* | 11/2017 | Beguesse | G06Q 30/0623 | |

* cited by examiner

METHOD AND DEVICE FOR SEARCHING ACCORDING TO SPEECH BASED ON ARTIFICIAL INTELLIGENCE

CROSS-REFERENCE TO RELATED APPLICATIONS

This application is based on and claims a priority to Chinese Patent Application Serial No. 201611079405.4, filed on Nov. 29, 2016, the entire content of which is incorporated herein by reference.

TECHNICAL FIELD

The present disclosure relates to the field of information processing technology, and more particularly, to a method and a device for searching according to a speech based on artificial intelligence.

BACKGROUND

Artificial Intelligence (AI for short) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. The speech recognition is a most important aspect of the artificial intelligence.

With the development of the speech recognition, applications of the speech recognition become increasingly wide. As an accuracy of the speech recognition improves, more and more users prefer to search via a speech so as to avoid inputting by a keyboard, thereby simplifying a searching process. At present, with the rapid development of intelligent terminal technology, more and more young people search via the speech on the intelligent terminal. It is to be noted, children, particular to preschoolers, prefer to interact with the intelligent terminal in speech.

SUMMARY

Embodiments of the present disclosure provide a method for searching according to a speech based on artificial intelligence. The method includes: identifying an input speech of a user to determine whether the input speech is a child speech; filtrating a searched result obtained according to the input speech to obtain a filtrated searched result, if the input speech is the child speech; and feeding the filtrated searched result back to the user.

Embodiments of the present disclosure provide a device for searching according to a speech based on artificial intelligence. The device includes: a processor; a memory, configured to store instructions executable by the processor. The processor is configured to: identify an input speech of a user to determine whether the input speech is a child speech; filtrate a searched result obtained according to the input speech to obtain a filtrated searched result, if the input speech is the child speech; and feed the filtrated searched result back to the user.

Embodiments of the present disclosure provide a non-transitory computer readable storage medium. When instructions stored in the memory medium are executed by a processor of a server, a method for searching according to a speech based on artificial intelligence may be executed by the server. The method includes: identifying an input speech of a user to determine whether the input speech is a child speech; filtrating a searched result obtained according to the input speech to obtain a filtrated searched result, if the input speech is the child speech; and feeding the filtrated searched result back to the user.

Embodiments of the present disclosure provide a computer program product. When instructions in the computer program product are executed by a processor, a method for searching according to a speech is performed. The method includes: identifying an input speech of a user to determine whether the input speech is a child speech; filtrating a searched result obtained according to the input speech to obtain a filtrated searched result, if the input speech is the child speech; and feeding the filtrated searched result back to the user.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
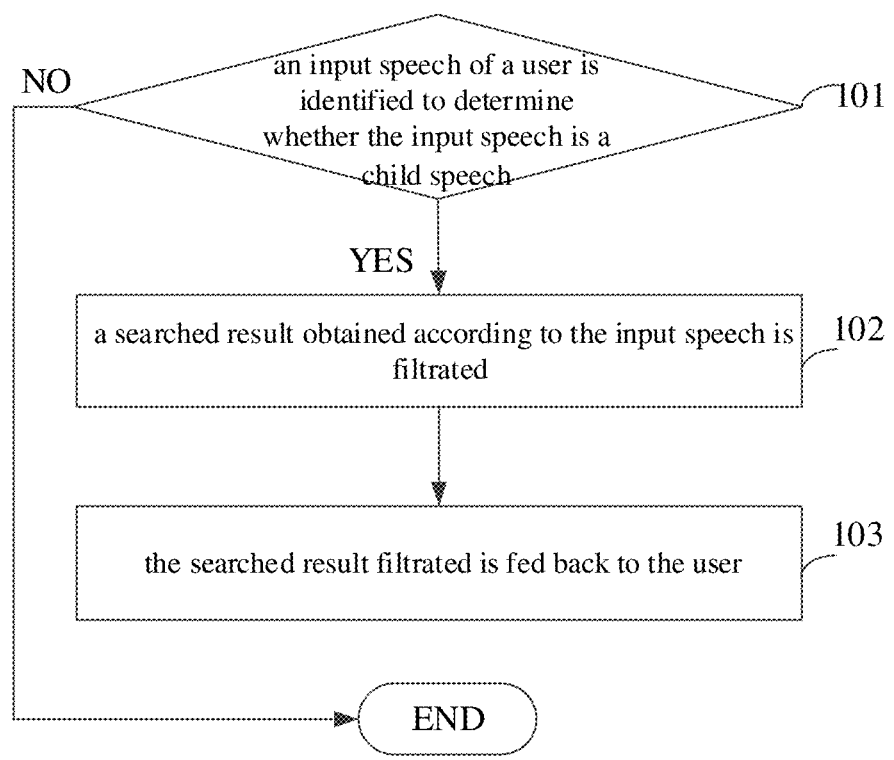
FIG. 1 is a flow chart illustrating a method for searching according to a speech based on artificial intelligence according to embodiments of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method and a device for searching according to a speech based on artificial intelligence according to embodiments of the present disclosure will be described with reference to the drawings.

FIG. 1 is a flow chart illustrating a method for searching according to a speech based on artificial intelligence according to embodiments of the present disclosure.

As illustrated in FIG. 1, the method includes followings.

At act S101, an input speech of a user is identified to determine whether the input speech is a child speech.

In an embodiment, a speech recognition model is pre-set in a search engine. The input speech may be identified via the speech identification model to determine a type of the input speech, such as male speech, female speech, child speech, etc. The speech identification model may be a machine learning model. The machine learning model may categorize the types of the input speeches after being trained and learning with a large number of sample data.

If it is determined that the input speech is the child speech, an act S102 is executed, otherwise, the process ends.

At act S102, a searched result obtained according to the input speech is filtrated.

In detail, the input speech may be converted into a text content corresponding to the input speech. Then, the text content is determined as a key-word for searching. The searched result corresponding to the text content of the input speech may be obtained based on the key-word for searching.

As information on Internet is all-embracing, a sensitive content or unsuitable internet information may be contained in the searched result obtained according to the text content. As the input speech is identified as the child speech in the act S101 (it is illustrated that the user corresponding to the input speech is a child), if the searched result without being filtrated is directly pushed to the child, it is possible that the child may receive much unsuitable internet information. The unsuitable internet information may bring a bad influence on physical and mental health of the child.

In an embodiment, in order to provide a better serve or a healthy network environment for the children, it needs to filtrate the searched result after the searched result is obtained according to the text content, such that the sensitive content unsuitable for the children is removed from the searched result. In detail, the searched result may be analyzed to determine whether the sensitive content unsuitable for the children is contained in the searched result. If it is determined that the sensitive content unsuitable for the children is contained in the searched result, the sensitive content may be removed from the searched result.

At act S103, the searched result filtrated is fed back to the user.

As the sensitive content unsuitable for the children is removed from a raw searched result (that is, filtrating the searched result is completed) to obtain the searched result filtrated, the content of the searched result filtrated is relatively healthy and suitable for the children. The searched result filtrated is fed back to the user.

With the method according to embodiments of the present disclosure, by identifying the input speech of the user to determine whether the user is the child, and by filtrating the searched result after it is determined that the user is the child, a differentiated setting of the searched result for children is achieved. Furthermore, the sensitive content unsuitable for the children is removed from the searching result, such that the content good for physical and mental health of children is pushed to the children.

Figure 2:
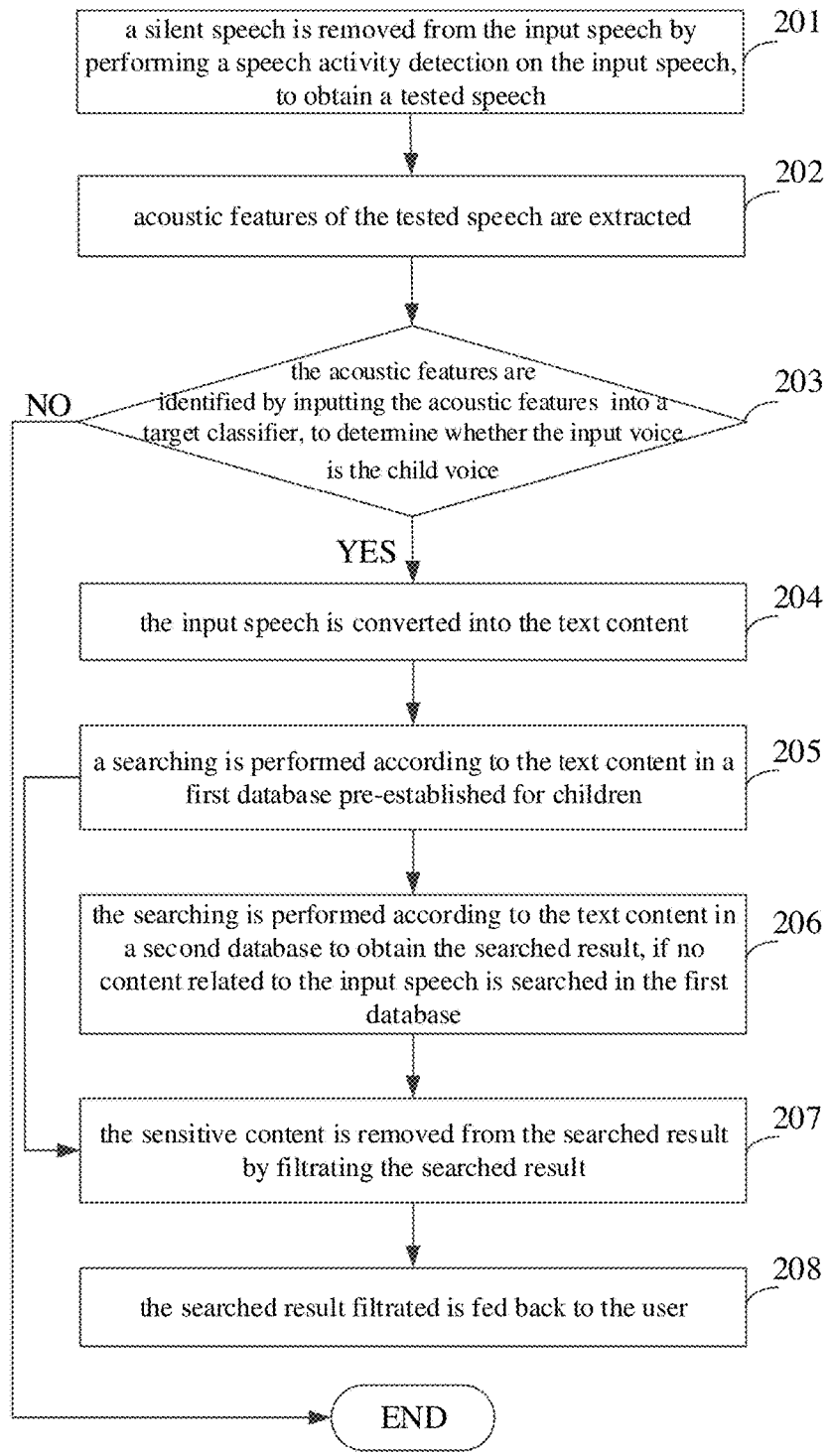
FIG. 2 is a flow chart illustrating another method for searching according to a speech based on artificial intelligence according to embodiments of the present disclosure.

FIG. 2 is a flow chart illustrating another method for searching according to a speech based on artificial intelligence according to embodiments of the present disclosure. As illustrated in FIG. 2, the method includes followings.

At act S201, a silent speech is removed from the input speech by performing a speech activity detection on the input speech, to obtain a tested speech.

There may be pauses during a process of speaking by the user. In order to reduce occupied searching resources, the voice activity detection (VAD in short) may be performed on the input speech to identify and remove a long silent speech period from a speech signal stream. Thus, broadband resources may be saved and a time delay, felt by the user, from an end to another end may be reduced.

In detail, the input speech may be divided by a preset first step size. For example, the first step size may be 10 ms to divide the input speech into frames of the input speech, (that is, a length of each of the frames of the input speech is 10 ms). The speech activity detection is performed on each of the frames of the input speech to remove the silent speech from the input speech. And the input speech without silent speeches is determined as the tested speech.

At act S202, acoustic features of the tested speech are extracted.

In detail, the tested speech may be divided by a preset second step size. For example, the second step size may be 25 ms to divide the tested speech into frames of the tested speech (that is the length of each of frames of the tested speech is 25 ms). Then, the acoustic features of each of the frames of the tested speech may be extracted by a preset third step size. For example, the third step may be 10 ms. In an embodiment, the acoustic features may be Filter bank40 (Fbakn40 in short) features or Mel-Frequency Cepstral Coefficients (MFCC in short) features.

At act S203, the acoustic features of the tested speech are identified by inputting the acoustic features of the tested speech into a target classifier, to determine whether the input speech is the child speech.

Further, the input speech without silent speeches is considered as the tested speech. In order to determine whether the tested speech is the child speech, it needs to extract the acoustic features of the tested speech. Then, the acoustic features of the tested speech are imputed into the target classifier which has been trained. The target classifier may identify the acoustic features of the tested speech to determine whether the tested speech is the child speech.

In detail, after the acoustic features corresponding to each of the frames of the tested speech are input into the target classifier, the target classifier may grade each frame to obtain a score of the each frame. Then the final identification result is given by combining all scores, i.e. it is determined whether the input speech is the child speech according to the scores of the frames. In an embodiment, an average value of the scores of the frames may be obtained and it is determined whether the input speech is the child speech according to the average value. If the average value is greater than or equal to a preset threshold, it is determined that the input speech is the child speech. If the average value is smaller than the preset threshold, it is determined that the input speech is not the child speech.

In an embodiment, if it is determined that the input speech is the child speech, an act S204 is executed. If it is determined that the input speech is not the child speech, the process ends.

Figure 3:
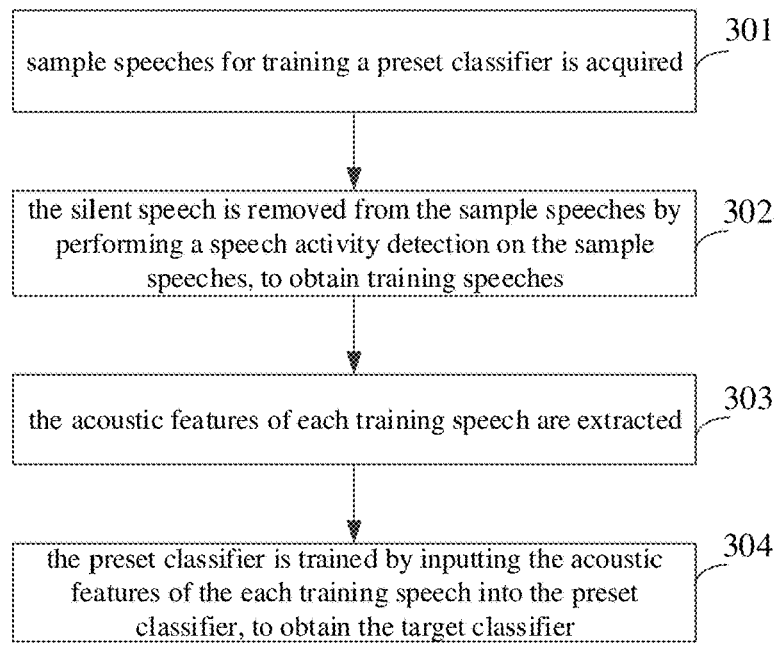
FIG. 3 is a flow chart illustrating training a classifier according to embodiments of the present disclosure.

In an embodiment, before the input speech is identified, it needs to train a classifier to obtain the target classifier. FIG. 3 is a flow chart illustrating training a classifier according to embodiments of the present disclosure. As illustrated in FIG. 3, training the classifier includes followings.

At act S301, sample speeches for training a preset classifier is acquired.

In the embodiment, children speeches may be sampled as the sample speeches. The preset classifier is trained with the sample speeches sampled. In an embodiment, the children speeches that are marked manually in history may be sampled as the sample speeches.

At act S302, the silent speech is removed from the sample speeches by performing a speech activity detection on the sample speeches, to obtain training speeches.

There may be pauses during a process of speaking by the user. In order to reduce occupied searching resources, after the sample speeches are acquired, the speech activity detection may be performed on the sample speeches to remove the silent speech from the sample speeches to obtain the training speeches.

In detail, each sample speech may be divided by a preset first step size. For example, the first step size is 10 ms to divide the each sample speech into frames of the each sample speech (that is, the length of each of the frames of the each sample speech is 10 ms). The speech activity detection is performed on each of the frames of the each sample speech to remove the silent speech from the each sample speech. The sample speech without silent speeches is determined as the training speech.

At act S303, the acoustic features of each training speech are extracted.

In detail, the each training speech may be divided by a preset second step size. For example, the second step size may be 25 ms to divide the each training speech into frames of the each training speech (that is, the length of each of the frames of the each training speech is 25 ms). Then, the acoustic features of each of the frames of the each training speech may be extracted by a preset third step size. The acoustic features may be Filter bank40 (Fbakn40 in short) features or Mel-Frequency Cepstral Coefficients (MFCC in short) features.

At act S304, the preset classifier is trained by inputting the acoustic features of the each training speech into the preset classifier, to obtain the target classifier.

In an embodiment, the classifier may be modeled based on Long Short-Time Memory Projection (LSTMP in short), Deep Neural Networks (DNN in short) or Recurrent Neural Networks (RNN in short). It is not limited to how to construct the classifier based on machine learning algorithms.

After the acoustic features of the each training speech are acquired, the acoustic features are input into the preset classifier to train the preset classifier. After a result output by the preset classifier is stable convergent, then the trained preset classifier is determined as the target classifier.

At act S204, the input speech is converted into the text content.

At act S205, a searching is performed according to the text content in a first database pre-established for children.

In order to provide a better serve or a healthy network environment for the children, in an embodiment, a database may be established for children previously, such as a database of tests, a database of nursery rhymes and cartoons, a database of puzzle games and the like.

After the input speech is converted into the text content, a searching may be performed according to the text content in the database pre-established for children. As the database is established for children, the searched result may more satisfy a searched demand of the children and it is determined that the information included in the database is relatively healthy.

If no content related to the input speech is searched in the database, the searching is performed in another database. That is, an act S206 is executed. If the content related to the input speech is searched in the database, an act S207 is executed.

At act S206, the searching is performed according to the text content in a second database to obtain the searched result, if no content related to the input speech is searched in the first database.

If the content related to the input speech is not searched according to the text content in the database established for children, in order to satisfy the user's demands, the searching may be performed according to the text content in other databases to obtain the content related to the input speech for the user.

At act S207, the sensitive content is removed from the searched result by filtrating the searched result.

As there is too much information on Internet, the searched result obtained according to the text content may contain the sensitive content or unhealthy information. As the input speech is identified as the child speech in the act S203 (it is illustrated that the user corresponding to the input speech is a child), if the searched result without being filtrated is directly pushed to the child, it is possible that the child may receive much unsuitable internet information. The unsuitable internet information may bring a bad influence on the physical and mental health of the child.

In an embodiment, in order to provide a better serve or a healthier internet environment for children, the searched result is filtrated to remove the sensitive content unsuitable for children from the searched result. In detail, the searched result may be analyzed to determine whether the sensitive content unsuitable for the children is contained in the searched result. If it is determined that the sensitive content unsuitable for the children is contained in the searched result, the sensitive content may be removed from the searched result.

In an embodiment, in order to provide internet information for the children better, the searched result obtained in the pre-established database may also be filtrated to further improve security of the information.

At act S208, the searched result filtrated is fed back to the user.

As the sensitive content unsuitable for the children is removed from a raw searched result (that is, filtrating the searched result is completed), the content of the searched result filtrated is relatively healthy and suitable for the children. Then, the searched result filtrated is fed back to the user.

With the method according to embodiments of the present disclosure, by identifying the input speech of the user to determine whether the user is the child, and by filtrating the searched result after it is determined that the user is the child, a differentiated setting of the searched result for children is achieved. Furthermore, the sensitive content unsuitable for the children is removed from the searched result such that the content good for physical and mental health of children is pushed to the children.

Figure 4:
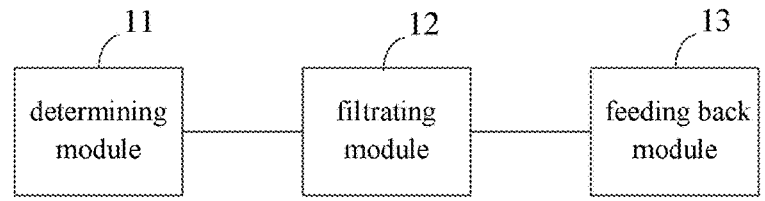
FIG. 4 is a block diagram illustrating a device for searching according to a speech based on artificial intelligence according to embodiments of the present disclosure.

FIG. 4 is a block diagram illustrating a device for searching according to a speech based on artificial intelligence according to embodiments of the present disclosure. The device includes a determining module 11, a filtrating module 12 and a feeding back module 13.

The determining module 11 is configured to identify an input speech of a user to determine whether the input speech is a child speech.

The filtrating module 12 is configured to filtrate a searched result obtained according to the input speech to obtain a filtrated searched result, if the input speech is the child speech.

The feeding back module 13 is configured to feed the filtrated searched result back to the user.

Figure 5:
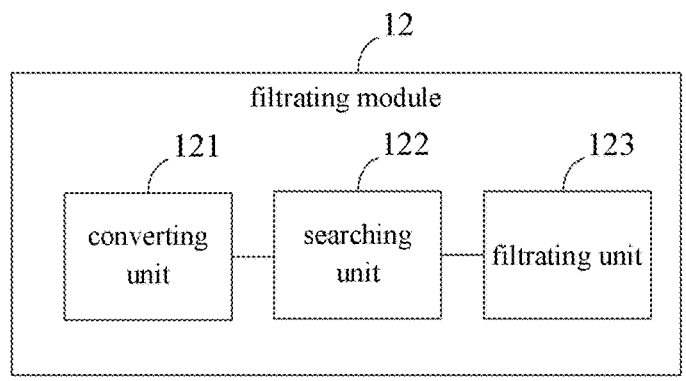
FIG. 5 is a block diagram illustrating a filtrating module provided according to embodiments of the present disclosure.

FIG. 5 is a block diagram illustrating a filtrating module provided according to embodiments of the present disclosure. As illustrated in FIG. 5, the filtrating module 12 includes a converting unit 121, a searching unit 122 and a filtrating unit 123.

The converting unit 121 is configured to convert the input speech into a text content.

The searching unit 122 is configured to obtain the searched result by searching according to the text content.

The filtrating unit 123 is configured to filtrate the searched result to remove a sensitive content unsuitable for a child.

Further, the searching unit 122 is configured to search according to the text content in a first database pre-established for children; and to search according to the text content in a second database to obtain the searched result, if no content related to the input speech is searched in the first database.

Figure 6:
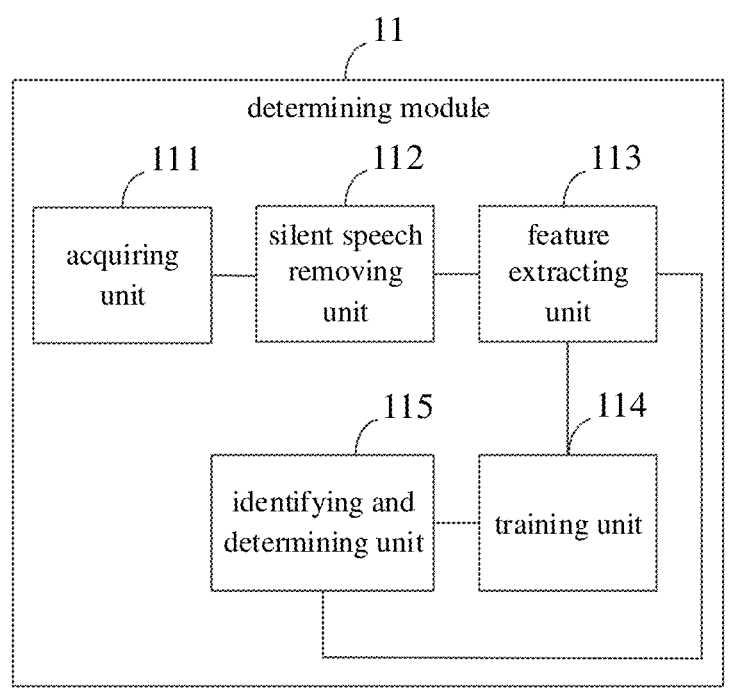
FIG. 6 is a block diagram illustrating a determining module provided according to embodiments of the present disclosure.

FIG. 6 is a block diagram illustrating a determining module provided according to embodiments of the present disclosure. As illustrated in FIG. 6, the determining module 11 includes an acquiring unit 111, a silent speech removing unit 112, a feature extracting unit 113 and a training unit 114.

The acquiring unit 111 is configured to acquire sample speeches for training a preset classifier.

The silent speech removing unit 112 is configured to remove a silent speech from the sample speeches by performing a speech activity detection on the sample speeches, to obtain training speeches.

The feature extracting unit 113 is configured to extract acoustic features of each training speech.

The training unit 114 is configured to train the preset classifier by inputting the acoustic features of the each training speech into the preset classifier, to obtain a target classifier.

Further, the silent speech removing unit 112 is specifically configured to divide each sample speech by a preset first step size, and remove the silent speech from each frame of the each sample speech by performing the speech activity detection on the each frame of the each sample speech, to obtain the each training speech.

The feature extracting unit 113 is specifically configured to divide the each training speech by a preset second step size; and to extract, by a preset third step size, the acoustic features of the each training speech that is divided by the preset second step size.

Further, the silent speech removing unit 112 is further configured to remove the silent speech from the input speech by performing the speech activity detection on the input speech, to obtain a tested speech.

The feature extracting unit 113 is further configured to extract the acoustic features of the tested speech.

Further, the determining module 11 includes: an identifying and determining unit 115, configured to identify the acoustic features of the tested speech by inputting the acoustic features of the tested speech into the target classifier, to determine whether the input speech is the child speech.

Further, the silent speech removing unit 112 is further specifically configured to: divide the input speech by a preset first step size, and remove the silent speech from each frame of the input speech by performing the speech activity detection on the each frame of the input speech, to obtain the tested speech.

The feature extracting unit 113 is further specifically configured to: divide the tested speech by a preset second step size; and extract, by a preset third step size, the acoustic features of the tested speech that is divided by the preset second step size.

The identifying and determining unit 115 is specifically configured to: grade the acoustic features corresponding to each frame of the tested speech by inputting the acoustic features corresponding to the each frame of the tested speech into the target classifier; acquire an average value of the each frame of the tested speech; and determine that the input speech is the child speech if the average value is greater than a preset threshold.

With the device according to embodiments of the present disclosure, by identifying the input speech of the user to determine whether the user is the child, and by filtrating the searched result after it is determined that the user is the child, a differentiated setting of the searched result for children is achieved. Furthermore, the sensitive content unsuitable for the children is removed from the searching result, such that the content good for physical and mental health of children is pushed to the children.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined without contradiction.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, alternatives, and modifications can be made in the embodiments by those skilled in the art without departing from scope of the present disclosure.

What is claimed is:

1. A method for searching according to a speech based on artificial intelligence, comprising:
    acquiring, by at least one computing device, sample speeches for training a preset classifier;
    removing, by the at least one computing device, a silent speech from the sample speeches by performing a speech activity detection on the sample speeches, to obtain training speeches;
    extracting, by the at least one computing device, acoustic features of each training speech; and
    training, by the at least one computing device, the preset classifier by inputting the acoustic features of the each training speech into the preset classifier, to obtain a target classifier;
    identifying, by at least one computing device, an input speech of a user to determine whether the input speech is a child speech;
    filtrating, by the at least one computing device, a searched result obtained according to the input speech to obtain a filtrated searched result, if the input speech is the child speech; and
    feeding, by the at least one computing device, the filtrated searched result to the user,
    wherein removing, by the at least one computing device, the silent speech from the sample speeches by performing a speech activity detection on the sample speeches, to obtain training speeches comprises:
    dividing, by the at least one computing device, each sample speech into frames by a preset first step size, and removing, by the at least one computing device, the silent speech from each frame of the each sample speech by performing the speech activity detection on the each frame of the each sample speech, to obtain the each training speech;
    wherein extracting, by the at least one computing device, the acoustic features of each training speech comprises:
    dividing, by the at least one computing device, the each training speech by a preset second step size; and
    extracting, by the at least one computing device, by a preset third step size, the acoustic features of the each training speech after dividing by the preset second step size.

2. The method according to claim 1, wherein filtrating, by the at least one computing device, a searched result obtained according to the input speech comprises:
    converting, by the at least one computing device, the input speech into a text content;
    obtaining, by the at least one computing device, the searched result by searching according to the text content; and
    filtrating, by the at least one computing device, the searched result to remove a sensitive content unsuitable for a child.

3. The method according to claim 2, wherein obtaining, by the at least one computing device, the searched result by searching according to the text content comprises:
    searching, by the at least one computing device, according to the text content in a first database pre-established for children; and
    searching, by the at least one computing device, according to the text content in a second database to obtain the searched result, if no content related to the input speech is searched in the first database.

4. The method according to claim 1, wherein identifying, by the at least one computing device, an input speech of a user to determine whether the input speech is a child speech comprises:
    removing, by the at least one computing device, a silent speech from the input speech by performing the speech activity detection on the input speech, to obtain a tested speech;
    extracting, by the at least one computing device, acoustic features of the tested speech; and
    identifying, by the at least one computing device, the acoustic features of the tested speech by inputting the acoustic features of the tested speech into the target classifier, to determine whether the input speech is the child speech.

5. The method according to claim 4, wherein
removing, by the at least one computing device, the silent speech from the input speech by performing the speech activity detection on the input speech, to obtain a tested speech comprises:
dividing, by the at least one computing device, the input speech into frames by a preset first step size, and removing, by the at least one computing device, the silent speech from each frame of the input speech by performing the speech activity detection on the each frame of the input speech, to obtain the tested speech;
extracting, by the at least one computing device, acoustic features of the tested speech comprises:
dividing, by the at least one computing device, the tested speech by a preset second step size; and
extracting, by the at least one computing device, by a preset third step size, the acoustic features of the tested speech after dividing by the preset second step size;
and, identifying, by the at least one computing device, the acoustic features of the tested speech by inputting the acoustic features of the tested speech into the target classifier, to determine whether the input speech is the child speech comprises:
grading, by the at least one computing device, the acoustic features of the tested speech by inputting the acoustic features of the tested speech into the target classifier;
acquiring, by the at least one computing device, an average value of the tested speech; and
determining, by the at least one computing device, that the input speech is the child speech if the average value is greater than a preset threshold.

6. A device for searching according to a speech based on artificial intelligence, comprising:
a processor; and
a memory, configured to store instructions executable by the processor, wherein the processor is configured to:
acquire sample speeches for training a preset classifier;
remove a silent speech from the sample speeches by performing a speech activity detection on the sample speeches, to obtain training speeches;
extract acoustic features of each training speech; and
train the preset classifier by inputting the acoustic features of the each training speech into the preset classifier, to obtain a target classifier;
identify an input speech of a user to determine whether the input speech is a child speech;
filtrate a searched result obtained according to the input speech to obtain a filtrated searched result, if the input speech is the child speech; and
feed the filtrated searched result to the user,
wherein the processor is configured to remove a silent speech from the sample speeches by performing a speech activity detection on the sample speeches, to obtain training speeches by acts of:
dividing each sample speech into frames by a preset first step size, and removing the silent speech from each frame of the each sample speech by performing the speech activity detection on the each frame of the each sample speech, to obtain the each training speech;
and the processor is configured to extract the acoustic features of each training speech by acts of:
dividing the each training speech by a preset second step size; and
extracting by a preset third step size, the acoustic features of the each training speech after dividing by the preset second step size.

7. The device according to claim 6, wherein the processor is configured to filtrate the searched result obtained according to the input speech by acts of:
converting the input speech into a text content;
obtaining the searched result by searching according to the text content; and
filtrating the searched result to remove a sensitive content unsuitable for a child.

8. The device according to claim 7, wherein the processor is configured to obtain the searched result by searching according to the text content by acts of:
searching according to the text content in a first database pre-established for children; and
searching according to the text content in a second database to obtain the searched result, if no content related to the input speech is searched in the first database.

9. The device according to claim 6, wherein the processor is configured to identify an input speech of a user to determine whether the input speech is a child speech by acts of:
removing a silent speech from the input speech by performing the speech activity detection on the input speech, to obtain a tested speech;
extracting acoustic features of the tested speech; and
identifying the acoustic features of the tested speech by inputting the acoustic features of the tested speech into the target classifier, to determine whether the input speech is the child speech.

10. The device according to claim 9, wherein the processor is configured to remove the silent speech from the input speech by performing the speech activity detection on the input speech, to obtain a tested speech by acts of:
dividing the input speech into frames by a preset first step size, and removing the silent speech from each frame of the input speech by performing the speech activity detection on the each frame of the input speech, to obtain the tested speech;
the processor is configured to extract acoustic features of the tested speech by acts of:
dividing the tested speech by a preset second step size; and
extracting by a preset third step size, the acoustic features of the tested speech after dividing by the preset second step size,
and the processor is configured to identify the acoustic features of the tested speech by inputting the acoustic features of the tested speech into the target classifier, to determine whether the input speech is the child speech by acts of:
grading the acoustic features of the tested speech by inputting the acoustic features of the tested speech into the target classifier;
acquiring an average value of the tested speech; and
determining that the input speech is the child speech if the average value is greater than a preset threshold.

11. A non-transitory computer readable storage medium comprising instructions, wherein the instructions are executed by a processor of a device to perform:
acquiring sample speeches for training a preset classifier;
removing a silent speech from the sample speeches by performing a speech activity detection on the sample speeches, to obtain training speeches;
extracting acoustic features of each training speech; and training the preset classifier by inputting the acoustic features of the each training speech into the preset classifier, to obtain a target classifier;
identifying an input speech of a user to determine whether the input speech is a child speech;
filtrating a searched result obtained according to the input speech to obtain a filtrated searched result, if the input speech is the child speech; and
feeding the filtrated searched result to the user,
wherein removing a silent speech from the sample speeches by performing a speech activity detection on the sample speeches, to obtain training speeches comprises:
dividing each sample speech into frames by a preset first step size, and removing the silent speech from each frame of the each sample speech by performing the speech activity detection on the each frame of the each sample speech, to obtain the each training speech;
wherein extracting the acoustic features of each training speech comprises:
dividing the each training speech by a preset second step size; and
extracting by a preset third step size, the acoustic features of the each training speech after dividing by the preset second step size.

12. The non-transitory computer readable storage medium according to claim 11, wherein filtrating a searched result obtained according to the input speech comprises:
converting the input speech into a text content;
obtaining the searched result by searching according to the text content; and
filtrating the searched result to remove a sensitive content unsuitable for a child.

13. The non-transitory computer readable storage medium according to claim 12, wherein obtaining the searched result by searching according to the text content comprises:
searching according to the text content in a first database pre-established for children; and
searching according to the text content in a second database to obtain the searched result, if no content related to the input speech is searched in the first database.

14. The non-transitory computer readable storage medium according to claim 11, wherein identifying an input speech of a user to determine whether the input speech is a child speech comprises:
removing a silent speech from the input speech by performing the speech activity detection on the input speech, to obtain a tested speech;
extracting acoustic features of the tested speech; and
identifying the acoustic features of the tested speech by inputting the acoustic features of the tested speech into the target classifier, to determine whether the input speech is the child speech.

15. The non-transitory computer readable storage medium according to claim 14, wherein removing the silent speech from the input speech by performing the speech activity detection on the input speech, to obtain a tested speech comprises:
dividing the input speech into frames by a preset first step size, and removing the silent speech from each frame of the input speech by performing the speech activity detection on the each frame of the input speech, to obtain the tested speech;
extracting acoustic features of the tested speech comprises:
dividing, by the at least one computing device, the tested speech by a preset second step size; and
extracting by a preset third step size, the acoustic features of the tested speech after dividing by the preset second step size;
and wherein, identifying the acoustic features of the tested speech by inputting the acoustic features of the tested speech into the target classifier, to determine whether the input speech is the child speech comprises:
grading the acoustic features of the tested speech by inputting the acoustic features of the tested speech into the target classifier;
acquiring an average value of the tested speech; and
determining that the input speech is the child speech if the average value is greater than a preset threshold.

* * * * *